United States Patent
Liu et al.

(10) Patent No.: US 7,215,956 B2
(45) Date of Patent: May 8, 2007

(54) METHOD AND APPARATUS FOR SCANNING FREQUENCY CHANNELS FOR HANDOFF CANDIDATES WHILE MINIMIZING BATTERY CONSUMPTION

(75) Inventors: Jing Liu, Boulder, CO (US); Jon James Anderson, Boulder, CO (US); Kurt William Otte, Erie, CO (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/859,800

(22) Filed: Jun. 2, 2004

(65) Prior Publication Data

US 2005/0096053 A1  May 5, 2005

Related U.S. Application Data (60) Provisional application No. 60/560,342, filed on Apr. 6, 2004, provisional application No. 60/517,451, filed on Nov. 4, 2003.

(51) Int. Cl.
*H04Q 7/20* (2006.01)
(52) U.S. Cl. .................... 455/434; 455/436; 455/161.1
(58) Field of Classification Search ............... 455/436, 455/434, 435.2, 435.3, 437, 438, 439, 442, 455/450, 452.2, 509, 513, 67.11, 125, 161.1; 370/329, 330, 331, 332, 337
See application file for complete search history.

(56) References Cited

U.S. PATENT DOCUMENTS

| | | | | |
|---|---|---|---|---|
| 5,438,688 A | * | 8/1995 | Masaki | 455/161.2 |
| 5,574,996 A | | 11/1996 | Raith | 455/161.3 |
| 5,999,816 A | | 12/1999 | Tiedemann, Jr. et al. | 455/437 |
| 6,229,792 B1 | | 5/2001 | Anderson et al. | 370/280 |
| 6,385,460 B1 | | 5/2002 | Wan | 455/515 |
| 6,807,163 B1 | * | 10/2004 | Shi | 370/337 |
| 2002/0111158 A1 | | 8/2002 | Tee | 455/421 |

* cited by examiner

*Primary Examiner*—Jean Gelin
(74) *Attorney, Agent, or Firm*—Thomas Rouse; Charles Brown; Kenyon S. Jenckes (57) ABSTRACT

Techniques for scanning other frequency channels for candidate base stations are described. In one scheme, the scanning of other frequency channels is performed based on the received signal quality (e.g., pilot Ec/Io) for an active base station that a wireless device is monitoring for user-specific and overhead messages. The scanning is bypassed if the active pilot Ec/Io exceeds a high threshold and performed if the active pilot Ec/Io is between the high threshold and a low threshold. In another scheme, the scanning of other frequency channels is performed at a rate that is a function of the active pilot Ec/Io. In yet another scheme, the scanning of other frequency channels is performed based on the active pilot Ec/Io and further using an adaptive timer. The timer is set to an initial value and thereafter adjusted by variable amounts determined by active pilot Ec/Io measurements.

13 Claims, 9 Drawing Sheets

METHOD AND APPARATUS FOR SCANNING FREQUENCY CHANNELS FOR HANDOFF CANDIDATES WHILE MINIMIZING BATTERY CONSUMPTION

This application claims the benefit of provisional U.S. Application Ser. No. 60/517,451, entitled "Method and Apparatus for Scanning CDMA Frequencies for Potential Handoff Candidates While Minimizing Battery Loss in Slotted Sleep Mode," filed Nov. 4, 2003 and U.S. Application Ser. No. 60/560,342, entitled "Method and Apparatus for Scanning Frequency Channels for Handoff Candidates While Minimizing Battery Consumption," filed Apr. 6, 2004.

BACKGROUND

I. Field

The present invention relates generally to communication, and more specifically to techniques for scanning frequency channels to search for candidate base stations to potentially handoff in a wireless communication system.

II. Background

A wireless device (e.g., a cellular phone) in a wireless communication system is typically designed to operate in one of several modes, such as "active" and "idle", at any given moment. In the active mode, the wireless device can actively exchange data with one or more base stations in the system, e.g., for a voice or data call. In the idle mode, the wireless device typically monitors a paging channel for messages applicable to the device. Such messages may include page messages that alert the wireless device to the presence of an incoming call and overhead messages that carry system and other information for the device.

In the idle mode, a wireless device continues to consume power to sustain circuitry needed to monitor the signals transmitted by the base stations in the system. The wireless device may be portable and powered by an internal battery. Power consumption by the device in the idle mode decreases the available battery power, which then shortens the standby time between battery recharges and the talk time when a call is placed or received. Therefore, it is highly desirable to minimize power consumption in the idle mode to increase battery life.

In one common technique for reducing power consumption in the idle mode, user-specific messages are sent on the paging channel to the wireless device at designated times, if at all. The paging channel is divided into numbered "slots". The wireless device is then assigned specific slots on which it may receive user-specific messages. With such a slotted paging channel, the wireless device can operate in a "slotted" mode whereby it periodically, rather than continuously, monitors the paging channel for messages from base stations in the system. In the slotted mode, the wireless device wakes up from a "sleep" state prior to its assigned slot, enters an "awake" state and processes the paging channel for messages, and reverts back to the sleep state if additional communication is not required. The wireless device remains in the awake state if a received message requires the device to perform additional tasks. In the time period between successive presences in the awake state, the wireless device is in the sleep state and the base stations do not send any pages or user-specific messages to the wireless device. The wireless device powers down as much circuitry as possible in the sleep state to conserve battery power.

The base stations in the system may transmit data and messages on multiple frequency channels. To enhance performance, it is desirable for the wireless device to scan these multiple frequency channels for candidate base stations while in the slotted mode. The wireless device may choose to listen to a specific base station (usually the base station with the highest signal-to-noise ratio (SNR) at the device) and designate this base station as the "active" base station. A "candidate" base station is one that is deemed to be "better" than the active base station and to which the wireless device may handoff to receive communication service, if all handoff criteria are satisfied. Another base station may be deemed to be better than the active base station if (1) the signal from this other base station is measured with a higher SNR at the wireless device than that of the active base station and (2) the higher SNR is above a predetermined threshold. The wireless device can typically process only one frequency channel at a time and is normally tuned to one of the frequency channels supported by the active base station. The wireless device would need to tune its RF circuitry to each different frequency channel in order to scan for candidate base stations on that frequency channel. The tuning and scanning for candidate base stations on other frequency channels may significantly deplete battery power and reduce standby time.

There is therefore a need in the art for techniques to scan other frequency channels for candidate base stations while minimizing battery consumption.

SUMMARY

Techniques for efficiently scanning other frequency channels for candidate base stations while minimizing the battery consumption are described herein. In one scheme, the scanning of other frequency channels is performed based on the received signal quality for the active base station, which is dependent on the channel conditions observed by the wireless device for this base station. The received signal quality may be quantified by, for example, a pilot energy-per-chip-to-total-noise ratio (Ec/Io). For this scheme, the scanning of other frequency channels is (1) bypassed if the pilot Ec/Io of the active base station (i.e., the active pilot Ec/Io) exceeds a high threshold (e.g., −8 dB) and (2) performed if the active pilot Ec/Io is between the high threshold and a low threshold (e.g., −16 dB). A signal recovery procedure may be performed if the active pilot Ec/Io is equal to or below the low threshold.

In another scheme, the scanning of other frequency channels is performed at a rate that is a function of the active pilot Ec/Io. A lower active pilot Ec/Io may indicate a greater need to find another base station, in which case scans may be performed more frequently to improve signal reception performance. Conversely, a higher active pilot Ec/Io may indicate a lesser need to find a better base station, in which case the scans may be performed less frequently to conserve battery power. The scanning may be bypassed if the active pilot Ec/Io exceeds the high threshold.

In yet another scheme, the scanning of other frequency channels is performed based on the active pilot Ec/Io and further using an "adaptive" timer. The adaptive timer is set to an initial value. Thereafter, whenever the pilot of the active base station is measured (e.g., at the awake period in each slot cycle), the adaptive timer is adjusted by a variable amount that is determined by the active pilot Ec/Io measurement. When the adaptive timer expires, a scan of another frequency channel may be performed if appropriate, and the timer is reset to the initial value. The timer may be updated, stalled, or reset if the active pilot Ec/Io exceeds the high threshold, but a scan is not performed if the timer is updated and expires.

In general, the scanning of other frequency channels is performed if deemed necessary based on the received signal quality for the active base station. This strategy provides good signal reception performance while minimizing battery consumption. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Figure 1:
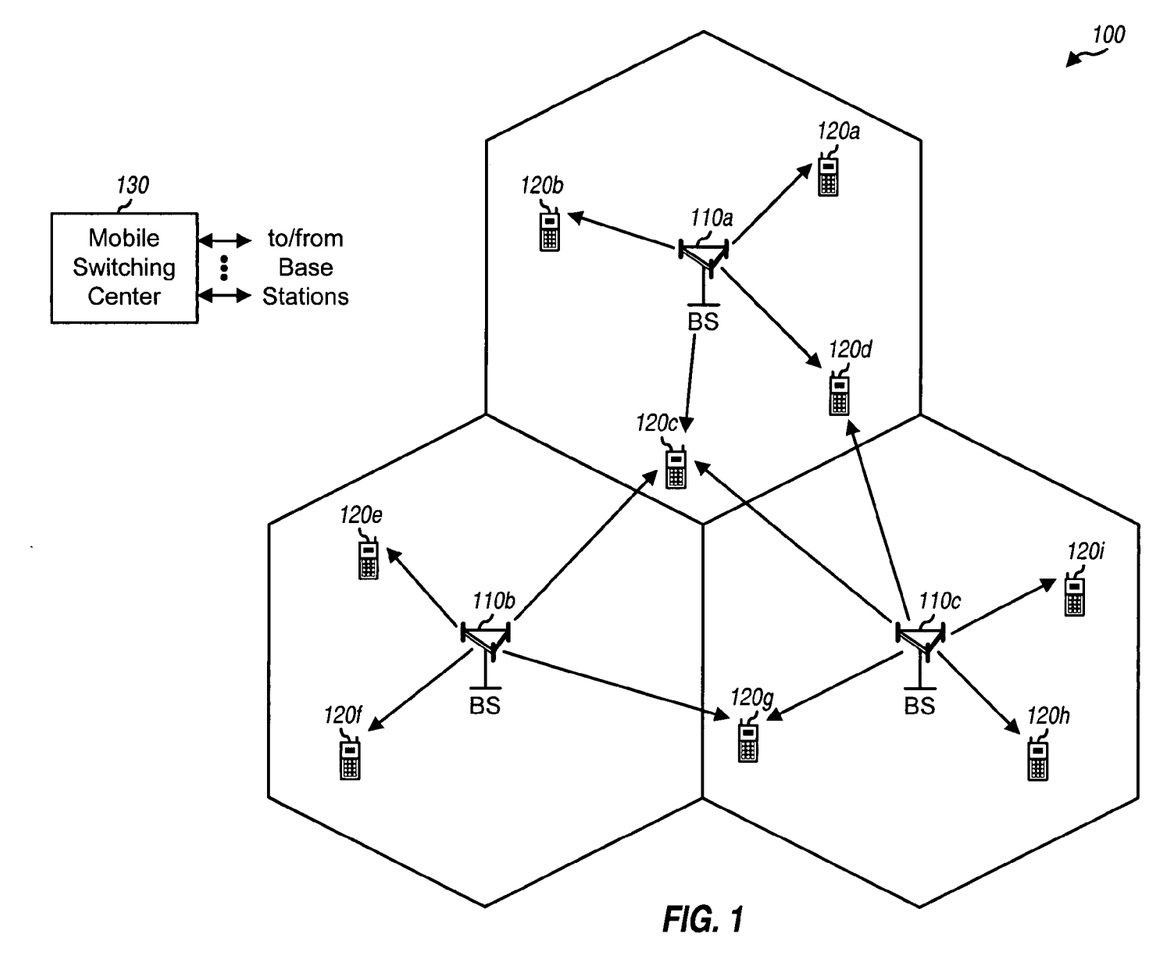
FIG. 1 shows a wireless communication system.

FIG. 1 shows a wireless communication system 100 with a number of base stations (BS) 110 that provide communication service for a number of wireless devices 120. A base station is a fixed station and may also be referred to as a base transceiver station (BTS), a Node B, an access point, or some other terminology. A base station and/or its coverage area may also be referred to as a "cell", depending on the context in which the term is used. Wireless devices 120 are typically dispersed throughout the system. A wireless device may be fixed or mobile and may also be referred to as a mobile station (MS), a user equipment (UE), a mobile equipment (ME), a terminal, or some other terminology. A mobile switching center (MSC) 130 provides coordination and control for base stations 110 and further controls the routing of data for the wireless devices served by these base stations. An MSC may also be referred to as a radio network controller (RNC) or some other terminology.

System 100 may be a Code Division Multiple Access (CDMA) system that may implement one or more CDMA standards such as IS-2000, IS-856, IS-95, Wideband CDMA (W-CDMA), and so on. IS-2000 is commonly known as CDMA 1x, IS-856 is commonly known as CDMA 1x EV-DO, and both are parts of a cdma2000 family of standards. System 100 may also be a Time Division Multiple Access (TDMA) system that may implement one or more TDMA standards such as Global System for Mobile Communications (GSM). These various standards are well known in the art. The techniques described herein for scanning other frequency channels for candidate base stations may be used for various wireless communication systems. For clarity, these techniques are specifically described for a cdma2000 system, which is a CDMA system that implements any one of the standards in the cdma2000 family.

Figure 2:
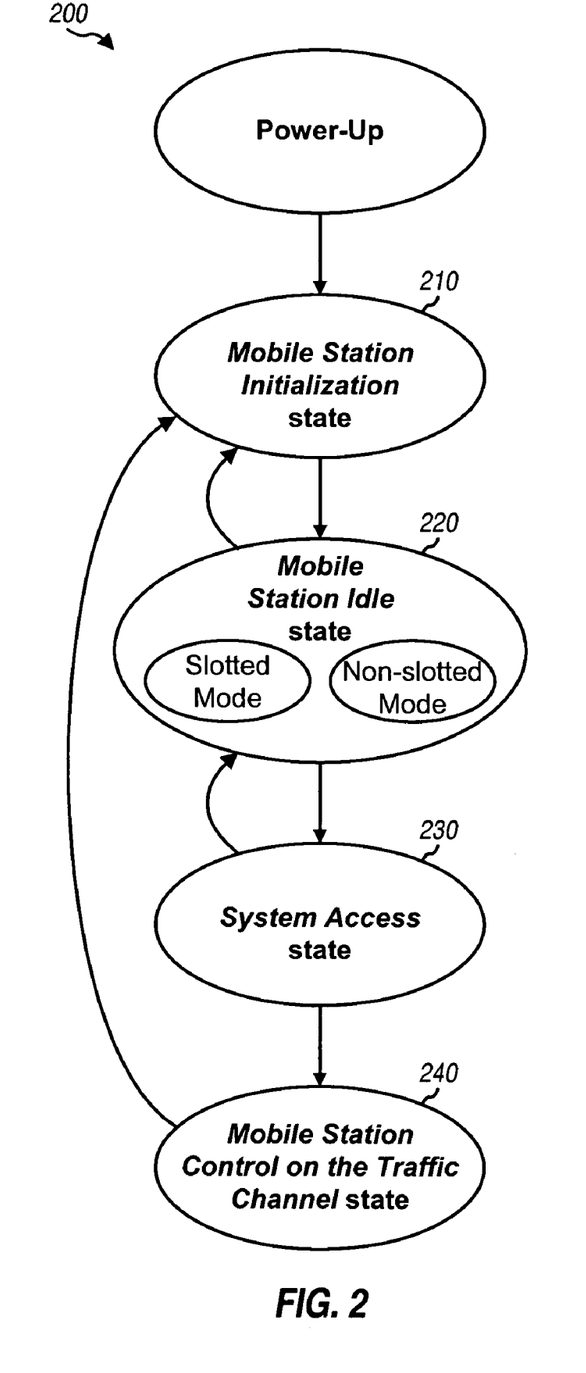
FIG. 2 shows a state diagram of Layer 3 processing states for cdma2000.

FIG. 2 shows a state diagram 200 of Layer 3 processing states for cdma2000. Upon power-up, a wireless device transitions to a Mobile Station Initialization state 210. In Init state 210, the wireless device selects a system to use and, if the selected system is a CDMA system, acquires the pilot of the CDMA system, obtains system configuration and timing information for the CDMA system, synchronizes its timing with that of the CDMA system, and transitions to a Mobile Station Idle state 220. In Idle state 220, the wireless device monitors a Paging Channel (PCH) or a Forward Common Control Channel (FCCCH) and a Broadcast Control Channel (BCCH) for messages, and performs idle handoff as necessary. The wireless device can also receive or originate a call, receive or initiate a message transmission, and perform other actions (such as responds to registration request from the base station) in Idle state 220. Upon initiating any of these actions, the wireless device transitions to a System Access state 230 to access the CDMA system and exchanges signaling with the system. Dedicated traffic channels may be set up when appropriate. The wireless device then proceeds to a Mobile Station Control on the Traffic Channel state 240 to communicate with the CDMA system and returns to Init state 210 upon terminating the call. The processing states for cdma2000 and various details of the Idle state are described in 3GPP2 C.S0005-C, entitled "Upper Layer (Layer 3) Signaling Standard for cdma2000 Spread Spectrum Systems, Release C," which is publicly available.

The PCH, FCCCH, and a Primary Broadcast Control Channel (BCCH) carry page messages and overhead messages for the wireless devices in the system. Each of these common channels is divided into (80 msec) numbered slots. A wireless device may operate in a non-slotted mode or a slotted mode while in Idle state 220. In the non-slotted mode, the wireless device continuously monitors the PCH or the FCCCH and BCCH for page and overhead messages. In the slotted mode, the wireless device monitors the PCH or FCCCH only in its assigned slots for messages. In the case of the FCCCH, the wireless device may go to the BCCH from time to time to obtain overhead messages.

Figure 3:
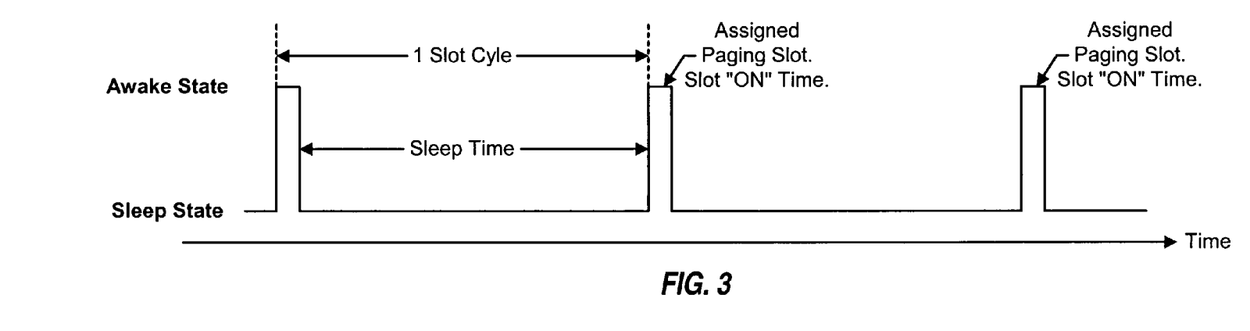
FIG. 3 shows a timing diagram for operation in a slotted mode.

FIG. 3 shows a timing diagram for operation in the slotted mode by the wireless device. While in the Idle state, the wireless device periodically transitions from a sleep state to an awake state to monitor the paging channel and perform other functions to maintain the communication link. The slot "ON" time denotes the time duration when the wireless device is in the awake state, and the sleep time denotes the time duration when the device is in the sleep state. An "assigned paging slot" refers to the time period in which user-specific messages may be sent to the wireless device while it is in the Idle state. The slot "ON" time typically spans the assigned paging slot, any necessary setup and warm-up times for the circuitry within the wireless device, and software overhead and "clean up" time. A "slot cycle" refers to the time span from the start of a paging slot that a wireless device may be paged to the next occurrence of a paging slot that the wireless device may be paged (i.e., the time span between the start of two consecutive assigned paging slots for the wireless device).

For cdma2000, the assigned paging slots for the wireless device are configurable and may be negotiated between the device and the system. The slot cycle for the wireless device, $T_{cycle}$, is determined by a slot cycle index (SCI) and may be expressed as:

$$T_{cycle} = 1.28 \times 2^{SCI}, \qquad \text{Eq (1)}$$

where $T_{cycle}$ is given in units of seconds. For cdma2000, the slot cycle index ranges from −4 to +7, and the slot cycle ranges from 80 msec to 163.84 seconds. The slot cycle index may be negotiated between the wireless device and the system. The sleep time for the wireless device may be extended with a higher slot cycle index, in which case the assigned paging slots are spaced further apart in time.

To increase system capacity, the base stations in system 100 may transmit signaling and data on multiple CDMA channels (or frequency channels). In this case, each base station in the system may periodically broadcast a CDMA Channel List Message or an Extended CDMA Channel List Message that carries a list of CDMA channels which may be received by the wireless devices within the coverage area of that base station. Each base station also periodically broadcasts a Neighbor List Message, an Extended Neighbor List Message, or a Universal Neighbor List Message that carries a list of neighbor base stations which may be received by the wireless devices within the coverage area of that base station. These neighbor base stations may be on the same or different CDMA channels. Thus, a wireless device can obtain a list of CDMA channels with transmitting base stations via several means.

While in the Idle state, the wireless device may receive user-specific page messages from base stations in the system. The wireless device typically selects one of the base stations as the active base station from which it listens for page messages. The wireless device may receive overhead messages from the active base station as well as other base stations.

It is desirable for the wireless device to continue to receive page messages from the system even if the device moves throughout the system or the channel conditions change. The wireless device can typically achieve this by performing a number of tasks. First, the wireless device measures the strength of the pilot transmitted by the active base station (which is called the "active pilot") to determine the quality of the signal received from this base station. Pilot measurements are typically made during the assigned paging slots. Each pilot measurement is normally given as an Ec/Io value for all detected signal components received via different signal paths (or multipaths) from the base station. The wireless device also periodically measures the pilots of neighbor base stations on the same CDMA channel as the active base station. If another base station with a sufficiently higher pilot Ec/Io is found, which may be the case if the device moves from the coverage area of the active base station into the coverage area of this better base station, then the wireless device performs an idle handoff to the better base station.

While in the Idle state, the wireless device also periodically scans other CDMA channels in order to search for candidate base stations to potentially handoff. For clarity, "scan" and "scanning" refer to a search for base stations on a frequency channel different from the frequency channel for the active base station. In general, the wireless device may be provided with any number of other CDMA channels to scan for candidate base stations. To conserve battery, the wireless device typically scans only one other CDMA channel at a time to search for candidate base stations. Depending on the number of base stations on the other CDMA channel being scanned, the search/processing for all base stations on that channel may or may not be completed in one scan. The selection of which other CDMA channel to scan is described below.

The scanning of other CDMA channels may be performed in a manner to achieve a set of goals. First, the scanning should consume as little battery power as possible so that standby time for the wireless device is minimally reduced. Second, the scanning should be such that visits across CDMA channels as well as revisits to CDMA channels with low potential are both minimized. Third, the scanning should be effective so that message error rate (MER) requirements specified in TIA/EIA-98-D, entitled "Recommended Minimum Performance Standards for cdma2000 Spread Spectrum Mobile Stations," can be achieved. In particular, TI/EIA-98-D essentially does not allow for a loss of a page message when the signal from the active base station can be demodulated, allows one page message to be missed when this signal is lost, and does not allow for a lost of two page messages if there is a signal on another CDMA channel that can be demodulated. Fourth, the scanning should be such that the wireless device can receive from the best available base station within a predetermined amount of time (10 seconds) from the time the wireless device detects the signal from the current active base station dropping well below another base station's signal, through use of idle handoff to base stations on other CDMA channels, if necessary. In general, the above goals necessitate a tradeoff between signal reception performance and standby time. Scanning other CDMA channels more frequently may improve signal reception performance but consumes more battery power and reduces standby time. The converse is true if scanning is done less frequently.

In one scheme, the scanning of other CDMA channels is performed based on the received signal quality for the active base station, which is in turn dependent on the channel conditions observed by the wireless device for this base station. The received signal quality may be quantified by the pilot Ec/Io. The scanning of other CDMA channels may be performed if deemed necessary based on the received signal quality, which then minimizes battery consumption.

The received signal quality for the active base station may be divided into three ranges or categories, as shown in Table 1. Different actions are then taken for these three categories.

TABLE 1

| Received Signal Quality | Active Pilot Ec/Io | Action |
|---|---|---|
| Good | Ec/Io > −8 dB | Bypass scanning of other CDMA channels. |
| Average | −8 dB ≧ Ec/Io > −16 dB | Perform scanning of other CDMA channels. |
| Poor | −16 dB ≧ Ec/Io | Perform signal recovery procedure. |

For the embodiment shown in Table 1, the three categories for the received signal quality are defined by two thresholds of −8 dB and −16 dB. Other threshold values may also be used. In general, fewer, additional, or different categories may be defined for the received signal quality, and this is within the scope of the invention.

The received signal quality is considered to be "poor" if the active pilot Ec/Io is equal to or less than −16 dB. The −16 dB value is typically used as a system loss threshold to indicate that a signal has been lost. If the active pilot Ec/Io is −16 dB lower, then a single path from the current active set is unlikely to be demodulated correctly by the wireless device and the system can be considered to be lost. As a result, the wireless device can perform a procedure to find another base station to receive communication service. Scanning of other CDMA channels may or may not be performed as part of the signal recovery procedure, which is described below.

The received signal quality is considered to be "good" if the active pilot Ec/Io is greater than −8 dB, which is 8 dB or 6.8 times better than the −16 dB system loss threshold. A good channel condition is anticipated to remain that way for at least a little while. Thus, scanning of other CDMA channels is not performed when the active pilot Ec/Io is greater than −8 dB in order to minimize battery consumption. Another reason for not performing scanning under good channel condition is the low likelihood of finding a suitable base station for handoff. A handoff to another base station is typically performed only if the pilot Ec/Io for this base station is better than the active pilot Ec/Io by some amount (e.g., 3 dB). This is done to avoid "handoff ping-ponging", which is a scenario whereby the wireless device is continually handed off between multiple base stations due to fluctuations in the pilot Ec/Io measurements for these base stations. Even if scanning is performed for the good channel condition, the likelihood of finding another base station that is better than the active base station by the required amount (e.g., with a pilot Ec/Io of −5 dB or better) is relatively low. Thus, even if some base stations may be found by a scan, these base stations are unlikely to be suitable for handoff and the scanning would be unproductive.

The scanning of other CDMA channels is performed if the received signal quality for the active base station is "average", which is the case if the active pilot Ec/Io is greater than −16 dB and less than or equal to −8 dB for the embodiment shown in Table 1. By applying a high threshold (e.g., of −8 dB) on the active pilot Ec/Io, scanning of other CDMA channels can be avoided if the active pilot is sufficiently strong, so that battery power can be conserved. By applying a low threshold (e.g., of −16 dB) on the active pilot Ec/Io, scanning of other CDMA channels can be performed as needed and in conjunction with other tasks for signal recovery. In effect, this scanning scheme uses the active pilot Ec/Io to determine whether or not there is a need to scan other CDMA channels for candidate base stations.

Figure 4:
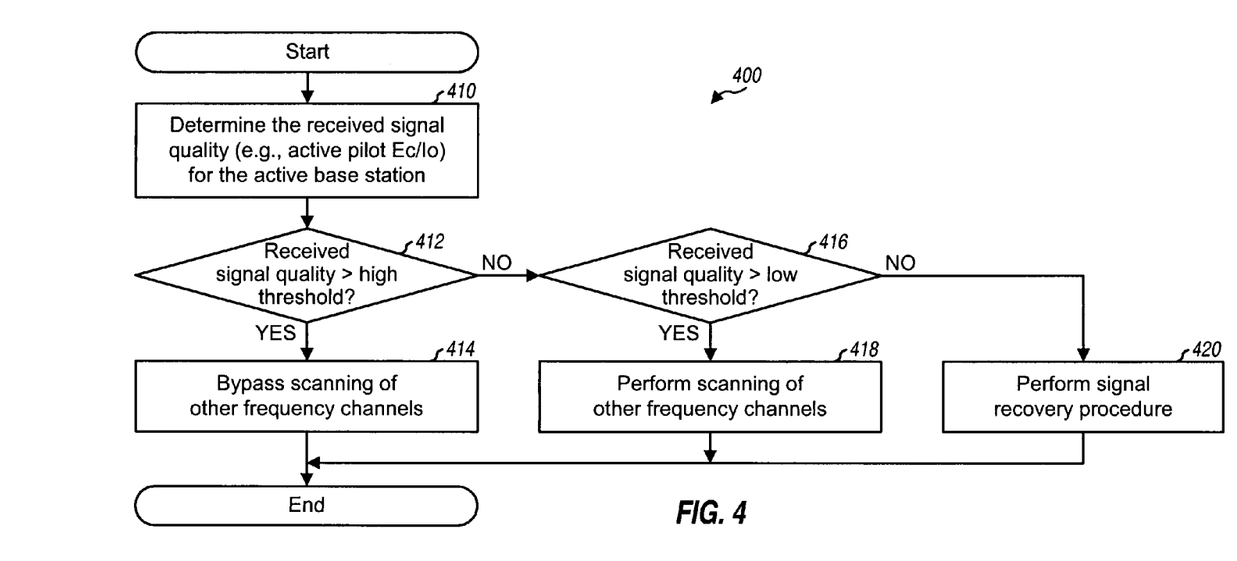
FIG. 4 shows a process for scanning other frequency channels based on received signal quality for the active base station.

FIG. 4 shows a process 400 for scanning other frequency channels for candidate base stations based on the scheme illustrated in Table 1. The received signal quality (e.g., active pilot Ec/Io) for the active base station is initially determined (block 410). A determination is then made whether the received signal quality exceeds a high threshold (e.g., −8 dB) (block 412). If the answer is 'yes', then scanning of other frequency channels is bypassed (block 414). Otherwise, a determination is next made whether the received signal quality exceeds a low threshold (e.g., −16 dB) (block 416). If the answer is 'yes', then scanning of other frequency channels is performed (block 418). Otherwise, a signal recovery procedure may be performed to find a suitable base station to receive communication service from (block 420).

In another scheme, the scanning of other CDMA channels is performed at a variable rate that is a function of the received signal quality for the active base station. A lower active pilot Ec/Io may indicate a greater need to find a better base station and may further suggest that it is harder to find a good pilot on the current CDMA channel. In this case, the other CDMA channels may be scanned more frequently to find a better base station and to improve signal reception performance. Conversely, a higher active pilot Ec/Io may indicate a lesser need to find a better base station and may further suggest a lower likelihood of finding a better base station. In this case, the other CDMA channels may be scanned less frequently to conserve battery power. The rate of the scans for other CDMA channels may thus be adjusted based on the determined need to scan. The timer may be effectively expanded or contracted based on the active pilot Ec/Io, which is used as an indication of the need to scan. The variable rate for scanning may also be selected to obtain the desired tradeoff between signal reception performance and battery life.

Figure 5:
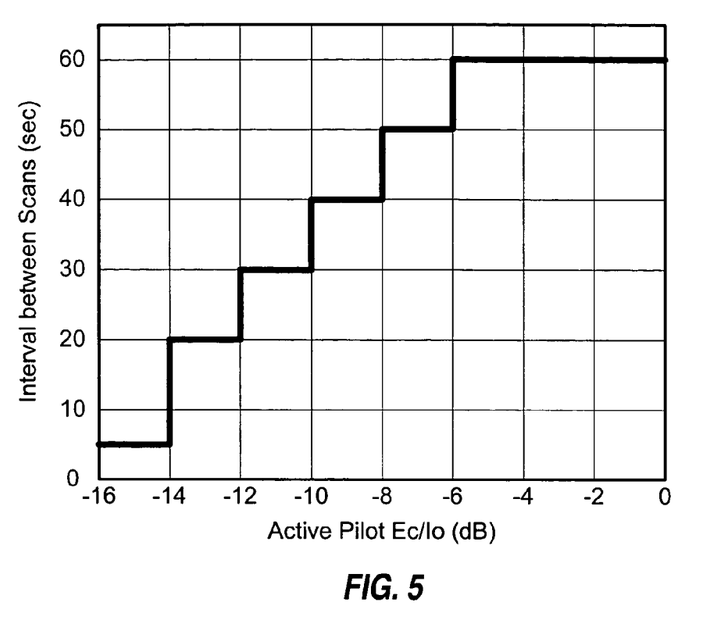
FIG. 5 shows a plot of the interval between scans versus active pilot Ec/Io.

FIG. 5 shows a plot of the interval between scans (or the scan rate) versus active pilot Ec/Io for a specific embodiment. For this embodiment, the interval between scans of other CDMA channels is 5.12 seconds when the active pilot Ec/Io is between −16 to −14 dB, approximately 20 seconds when the active pilot Ec/Io is between −14 to −12 dB, approximately 30 seconds when the active pilot Ec/Io is between −12 to −10 dB, approximately 40 seconds when the active pilot Ec/Io is between −10 to −8 dB, approximately 50 seconds when the active pilot Ec/Io is between −8 to −6 dB, and approximately 60 seconds when the active pilot Ec/Io is between −6 to 0 dB. FIG. 5 shows a specific embodiment. In general, any number of ranges of pilot Ec/Io values may be defined, and each range may be associated with any scan rate.

For a given wireless device design, the cost incurred by the scans of other CDMA channels may be quantified by the amount of reduction in standby time for the device. The standby time calculation is dependent on various factors such as (1) the duration of the awake time for each assigned paging slot (or the slot ON time), (2) the amount of time needed for each scan, which includes the time to tune the RF circuitry to a new CDMA channel and the time to perform a search for base stations on the new channel, (3) the slot cycle for the device, and (4) the interval between scans of other CDMA channels. The number of pilot Ec/Io ranges and the scan rates for these ranges may be selected based on a tradeoff between standby time reduction and signal reception performance.

In one implementation of this scheme, a "fixed" timer is used to indicate when to perform a scan of another CDMA channel. The timer is fixed in that it counts the actual time that has elapsed. The active pilot Ec/Io is measured and possibly averaged over the prior lifetime of the timer. The timer is set to a variable initial value that is determined by the active pilot Ec/Io, e.g., based on the function shown in FIG. 5. This initial value determines the lifetime or duration of the timer. The timer thereafter counts down. When the timer expires, a scan of another CDMA channel is performed. An idle handoff may be performed if a better base station is found by the scan. During the time that the timer counts down, new pilot Ec/Io measurements are made for the active base station. If an idle handoff is not performed, then the timer is set to a new initial value determined by the active pilot Ec/Io measured in the preceding interval. Although not shown in FIG. 5, scanning may be bypassed if the active pilot Ec/Io exceeds a high threshold (e.g., −8 dB).

Figure 6:
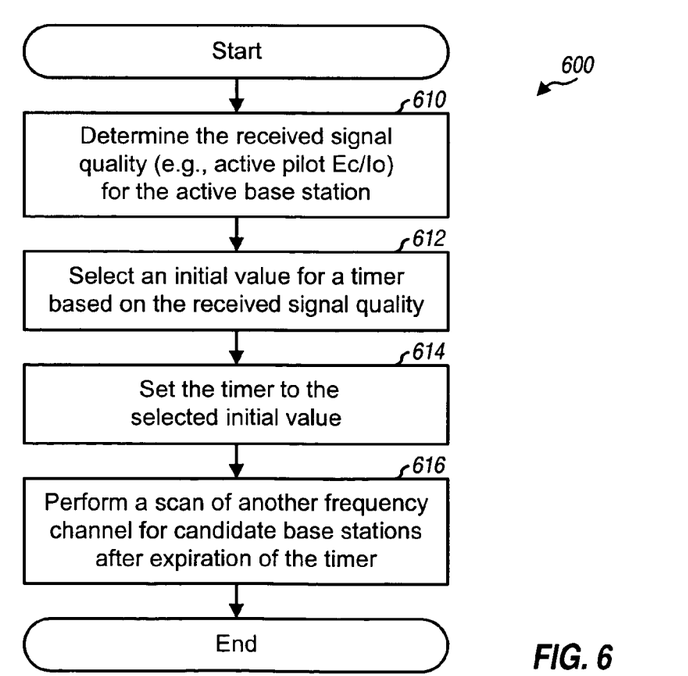
FIG. 6 shows a process for scanning other frequency channels based on a "fixed" timer that is set to a variable value determined by the received signal quality.

FIG. 6 shows a process 600 for scanning other frequency channels for candidate base stations based on the scheme illustrated in FIG. 5. The received signal quality (e.g., active pilot Ec/Io) for the active base station is initially determined (block 610). An initial value indicative of the duration for the timer is then selected based on the received signal quality (block 612). The received signal quality may fall within one of multiple ranges of values, and each range may be associated with a different initial value. The initial value associated with the range within which the received signal quality falls is then selected. The timer is set to the selected initial value (block 614). A scan of another frequency channel for candidate base stations is performed after expiration of the timer (block 616).

In yet another scheme, the scanning of other CDMA channels is performed based on the received signal quality for the active base station and further using an "adaptive" timer. The timer is adaptive in that it can be adjusted by a variable amount determined by the received signal quality. The received signal quality may be divided into multiple ranges, and scanning may be performed only if the active pilot Ec/Io falls within a selected range. For example, scanning may be performed if the active pilot Ec/Io is between −8 dB and −16 dB, as described above and shown in Table 1. The adaptive timer is set to an (e.g., predetermined) initial value. Thereafter, whenever the active pilot is measured (e.g., at each assigned paging slot), the adaptive timer is adjusted by a variable amount that is determined by the active pilot Ec/Io measurement. When the adaptive timer expires, a scan of another CDMA channel may be performed, and the timer is reset to the (predetermined) initial value. The timer may be adjusted, stalled, or reset if the active pilot Ec/Io exceeds the high threshold (e.g., −8 dB), but a scan is not performed if the timer is adjusted and expires.

For clarity, a specific implementation of the scheme with the adaptive timer is described below. For this implementation, the initial value for the timer is 20.48 seconds. The active pilot Ec/Io is measured in each slot cycle, and the timer is also updated in each slot cycle. The timer is adjusted (e.g., decremented) (1) by one slot cycle (i.e., $T_{cycle}$) if the active pilot Ec/Io is within an upper range and (2) by four times the slot cycle (i.e., $4 \cdot T_{cycle}$) if the active pilot Ec/Io is within a lower range. The upper range may be defined to be from −8 dB to −13 dB, or −8 dB ≧ x > −13 dB, and the lower range may be defined to be from −13 dB to −16 dB, or −13 dB ≧ x > −16 dB. For this implementation, the timer would expire in 20.48 seconds if the active pilot Ec/Io is detected to be within the upper range every time that it is measured before the timer expires. The timer would expire in 5.12 seconds if the active pilot Ec/Io is detected to be within the lower range for each measurement until the timer expires. The timer expires between 5.12 and 20.48 seconds if the active pilot Ec/Io fluctuates across the higher and lower ranges at least once when measured. The timer may also never expire if the active pilot Ec/Io is higher than the upper range for all measurements.

Figure 7A:
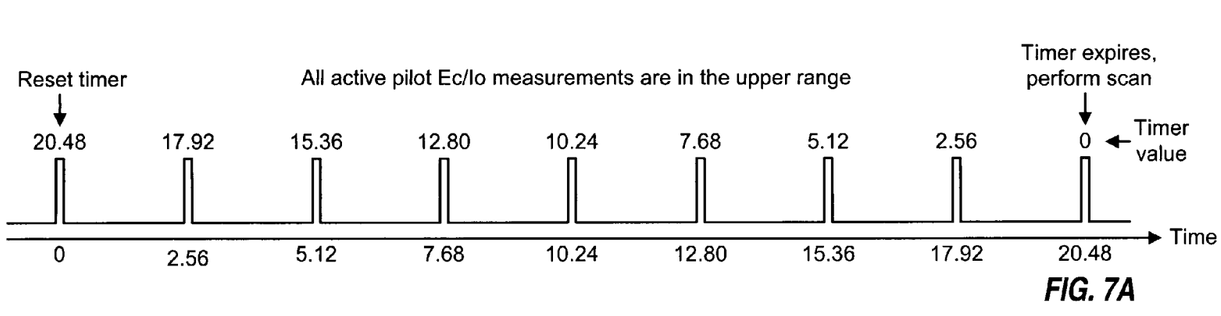
FIGS. 7A through 7C show the operation of an adaptive timer for three different scenarios.

FIG. 7A shows the operation of the adaptive timer for a scenario in which the active pilot Ec/Io is within the upper range for the entire lifetime of the timer. In this example, the slot cycle is 2.56 seconds (or $T_{cycle}$=2.56). The timer is set to 20.48 seconds at time 0. In each slot cycle thereafter, the active pilot Ec/Io is measured and determined to be within the upper range. The timer is thus decremented by $T_{cycle}$=2.56 seconds in each slot cycle. The timer expires at time 20.48 (or after 20.48 seconds). A scan of another CDMA channel may be performed at this time, and the timer is also reset to 20.48 seconds.

Figure 7B:
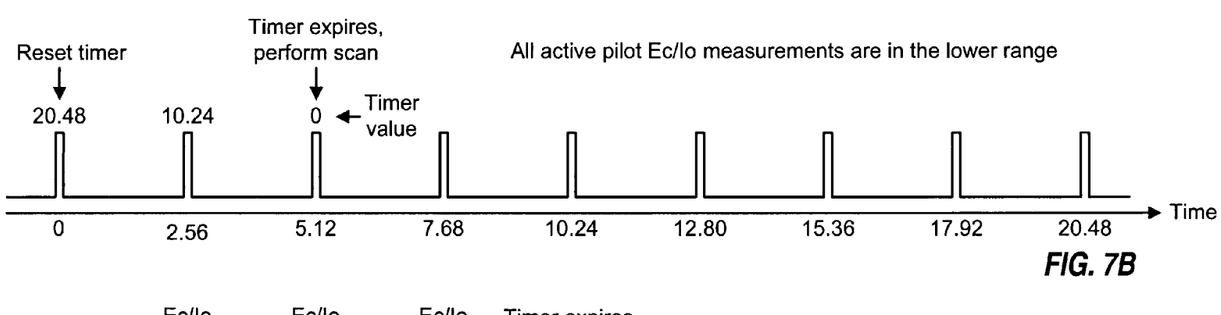

FIG. 7B shows the operation of the adaptive timer for a scenario in which the active pilot Ec/Io is within the lower range for the entire lifetime of the timer. Again, the slot cycle is 2.56 seconds, and the timer is set to 20.48 seconds at time 0. In each slot cycle thereafter, the active pilot Ec/Io is measured and determined to be within the lower range. The timer is then decremented by $4 \cdot T_{cycle}$=10.24 seconds in each slot cycle. The timer expires at time 5.12 (or after 5.12 seconds). A scan of another CDMA channel may be performed at this time, and the timer is also reset to 20.48 seconds.

Figure 7C:
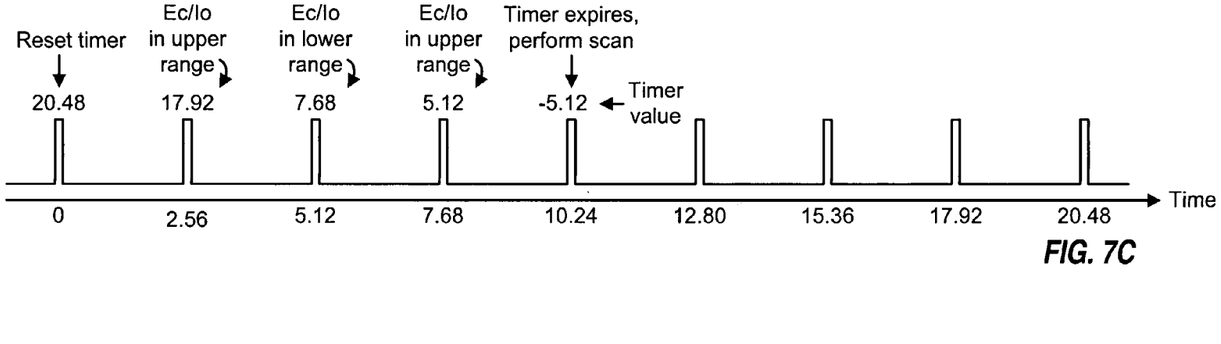

FIG. 7C shows the operation of the adaptive timer for a scenario in which the active pilot Ec/Io fluctuates across the two ranges during the lifetime of the timer. Again, the slot cycle is 2.56 seconds, and the timer is set to 20.48 seconds at time 0. In the first slot cycle, the active pilot Ec/Io is measured and determined to be within the upper range. The timer is thus decremented by $T_{cycle}$=2.56 seconds and has a new value of 17.92 seconds. In the next slot cycle, the active pilot Ec/Io is measured and determined to be within the lower range. The timer is then decremented by $4 \cdot T_{cycle}$=10.24 seconds and has a new value of 7.68 seconds. In the next slot cycle, the active pilot Ec/Io is measured and determined to be within the upper range. The timer is thus decremented by $T_{cycle}$=2.56 seconds and has a new value of 5.12 seconds. In the next slot cycle, the active pilot Ec/Io is measured and determined to be within the lower range. The timer is again decremented by $4 \cdot T_{cycle}$=10.24 seconds and expires. For this example, the timer expires at time 10.24 (or after 10.24 seconds). A scan of another CDMA channel may be performed at this time, and the timer is reset to 20.48 seconds.

As shown by the examples in FIGS. 7A through 7C, the adaptive timer is allowed to count down in its normal manner (i.e., decremented by the actual elapsed time) if the active pilot Ec/Io is within the upper range. The adaptive timer is sped up (or shortened) whenever the active pilot Ec/Io is within the lower range. This results in a scan being performed earlier if the received signal quality is degraded and endangering the MER performance. The duration or lifetime of the adaptive timer is dependent on the active pilot Ec/Io measurements obtained during the assigned paging slots. Furthermore, the timer is adaptive to the channel conditions, and the timer duration can be adjusted in real time based on the current channel conditions. The adaptive timer may also be viewed as performing a running average of the active pilot Ec/Io measurements and having a duration that is dependent on the average active pilot Ec/Io. In any case, the variable duration for the timer provides flexibility in the tradeoff between signal reception performance and standby time.

For the examples shown in FIGS. 7A through 7C, the adaptive timer is updated in each slot cycle and expires whenever its content is zero or a negative value. The timer duration is thus quantized by the slot cycle, $T_{cycle}$. For cdma2000, the slot cycle typically ranges from 80 msec to 20.48 seconds for SCI of −4 to 4, respectively. If the slot cycle is 10.24 or 20.48 seconds, then the timer cannot be shortened to 5.12 seconds. In this case, a scan of another CDMA channel may be performed in each slot cycle. The timer may also be quantized to a time resolution that is finer than the slot cycle or not exactly the slot cycle (e.g., by waking up earlier).

The above description is for one specific implementation of the scheme with the adaptive timer. For this implementation, two ranges are defined for the active pilot Ec/Io, and the timer is set to a fixed initial value of 20.48 seconds and thereafter decremented by either $T_{cycle}$ or $4 \cdot T_{cycle}$ in each slot cycle for the two ranges. These initial and decrement values are selected to obtain the desired tradeoff between signal reception performance and standby time. Other initial and decrement values may also be used, and this is within the scope of the invention. In general, the adaptive timer may be set to any initial value, any number of ranges may be defined for the active pilot Ec/Io, and each range may be associated with any decrement value.

The active pilot Ec/Io may exceed the high threshold (e.g., of −8 dB) some of the time. When such an event occurs, the adaptive timer may be manipulated in one of several ways. In one embodiment, the timer is reset to the initial value whenever the active pilot Ec/Io exceeds the high threshold. This has the effect of delaying scanning. In another embodiment, the timer is stalled (i.e., not decremented) whenever the active pilot Ec/Io exceeds the high threshold. This also has the effect of delaying scanning, albeit not as long as resetting the timer. In yet another embodiment, the timer is decremented by the actual elapsed time (or one slot cycle) whenever the active pilot Ec/Io is found to exceed the high threshold. This has the effect of extending the upper range to cover all values greater than −13 dB for the example described above. However, a frequency scan is not performed if the active pilot Ec/Io exceeds the high threshold, even if the timer is updated and expires. The expired timer would trigger a frequency scan in the next slot cycle, if the active pilot Ec/Io falls below the high threshold. The adaptive timer may also be updated in other manners.

For the two timer-based scanning schemes described above, the timer used to trigger scans of other CDMA channels may be reset based on various conditions. The timer may be reset after each scan of a CDMA channel, as noted above. The timer may also be reset after a handoff to a base station on another CDMA channel. However, the timer may continue to operate (instead of being reset or stalled) after a handoff to another base station on the same CDMA channel and may be adjusted by the pilot Ec/Io for the new active base station.

The wireless device can perform a scan of another CDMA channel immediately after the timer expires, as described above, if the device has all of the information needed to perform the scan. If such information is not available, then the wireless device can wait until the information becomes available and then perform the scan. As an example, the wireless device may perform a handoff to a base station in a list that may include, for example, the active base station plus a small number (e.g., 2 or 3) of the strongest received base stations. The wireless device typically performs such a handoff prior to its assigned paging slot in order to receive messages from the best possible base station. If the wireless device has just performed a handoff to a new active base station, then the device may not have current system information for the new base station. Such system information may be for the new configuration (e.g., band class, frequency channels, neighbor list, and so on) applicable for the new base station. Since some or all of this information may be needed for a scan of another CDMA channel, the wireless device waits until the information is obtained before performing the scan. This information can typically be obtained in one slot cycle for cdma2000. The wireless device can thus postpone the scan for one slot cycle after such a handoff.

The wireless device may transition between the slotted mode and the non-slotted mode for various reasons (e.g., due to a match of a quick paging bit, update of system information, and so on). The timer may be operated in the normal manner and can ignore transitions between the slotted and non-slotted modes.

Figure 8:
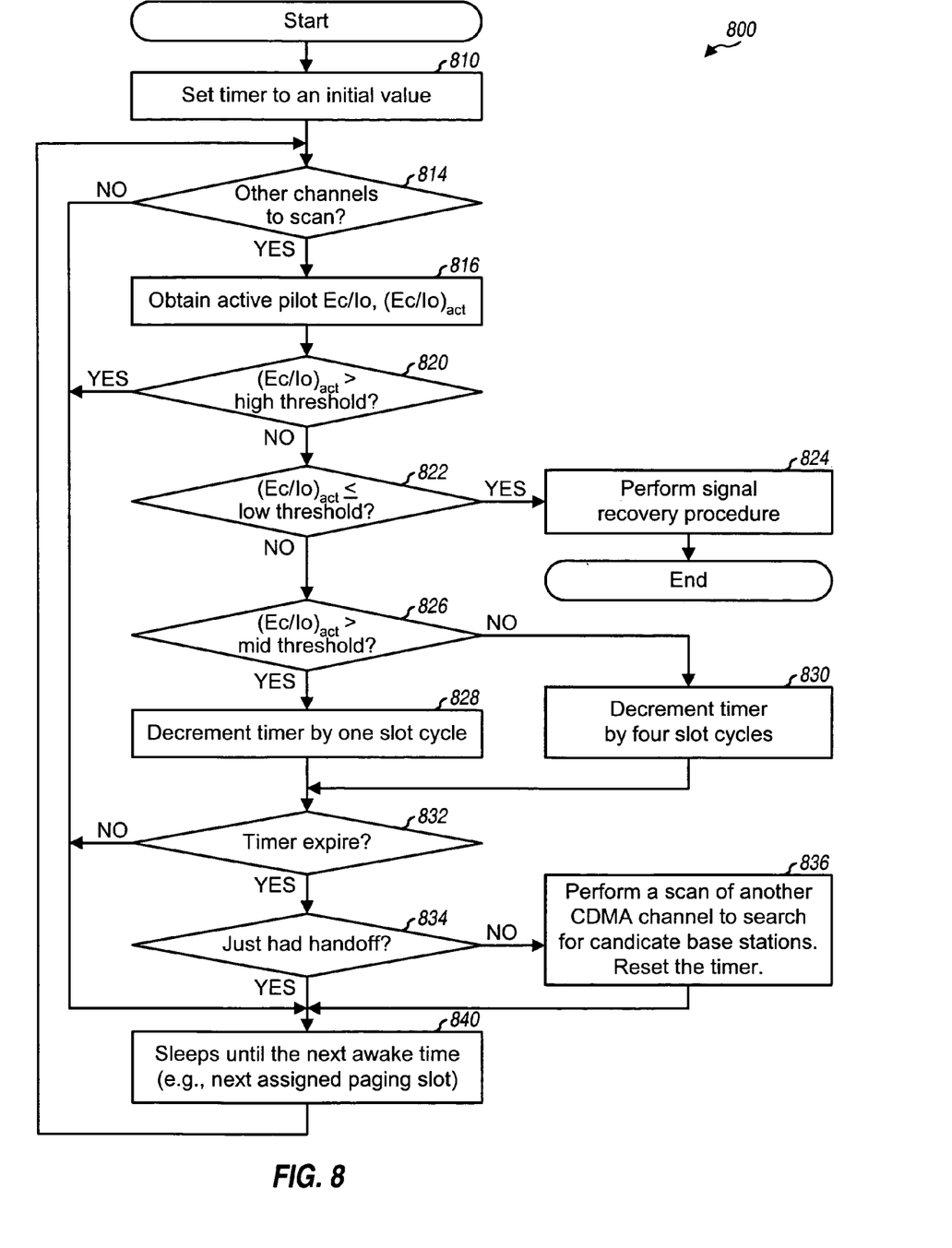
FIG. 8 shows a specific implementation for scanning other CDMA channels for candidate base stations using the adaptive timer.

FIG. 8 shows a specific implementation of a process 800 for scanning other CDMA channels for candidate base stations. The adaptive timer is set to an initial value (e.g., 20.48 seconds) (block 810). A determination is made whether there are other CDMA channels to scan (block 814). If the answer is 'no', the process proceeds to block 840 and the wireless device goes to sleep. Otherwise, a pilot Ec/Io measurement for the active base station is obtained (block 816). If the active pilot Ec/Io exceeds a high threshold (e.g., −8 dB), as determined in block 820, then the timer may be (1) maintained at the current value, (2) decremented by one slot cycle, $T_{cycle}$, or some other amount, (3) reset to the initial value, or (4) updated in some other manner. Regardless of how the timer may be updated, the wireless device goes to sleep and does not perform a frequency scan (block 840). If the active pilot Ec/Io falls below a low threshold (e.g., −16 dB), as determined in block 822, then the wireless device performs a signal recovery procedure (block 824). Otherwise, if the active pilot Ec/Io is between the high and low thresholds, then the timer is decremented by one slot cycle, $T_{cycle}$, (block 828) if the active pilot Ec/Io exceeds a mid threshold (e.g., −13 dB) (as determined in block 826) and decremented by four times the slot cycle, or $4 \cdot T_{cycle}$, (block 830) if the active pilot Ec/Io is between the low and mid thresholds.

After blocks 828 and 830, a determination is made whether the timer has expired (block 832). If the answer is 'no', then the wireless device goes to sleep (block 840). Otherwise, a determination is made whether the wireless device has just performed a handoff (block 834). If the answer is 'yes', then information needed for the scan of another CDMA channel may not be available, and the wireless device delays the scan for one slot cycle and goes to sleep (block 840). Otherwise, the wireless device performs a scan of another CDMA channel (block 836), resets the timer (block 810), and goes to sleep if a handoff is not required (block 840). From block 840, the process returns to block 814.

Figure 9:
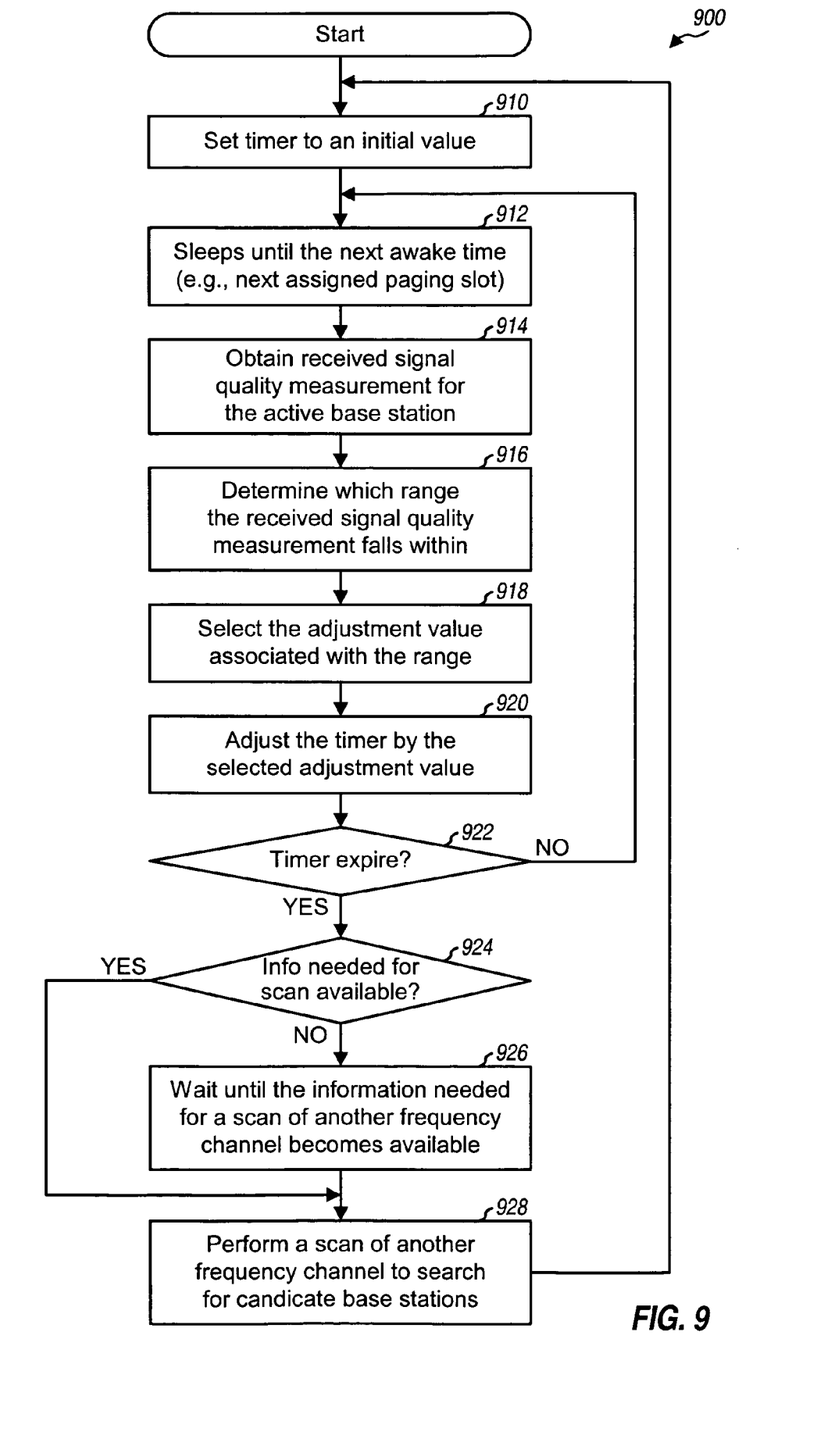
FIG. 9 shows a process for scanning other frequency channels using the adaptive timer.

FIG. 9 shows a generic process 900 for scanning other frequency channels for candidate base stations using the adaptive timer. The adaptive timer is set to an initial value (e.g., 20.48 seconds) (block 910), and the wireless device sleeps until the next awake time (e.g., the next assigned paging slot) (block 912). At the awake time, a received signal quality measurement is obtained for the active base station (block 914). The received signal quality measurement falls within one of multiple (e.g., four) ranges of measurement values, and this range is determined (block 916). One range covers the low measurement values (e.g., below −16 dB), and signal recovery may be performed if the received signal quality measurement falls within this range. Each of the remaining ranges may be associated with a different adjustment value, and ranges with progressively higher measurement values are generally associated with adjustment values that cause the timer to expire in progressively longer time durations. The adjustment value for the range within which the received signal quality measurement falls is selected (block 918). The timer is then adjusted by the selected adjustment value, which is dependent on the received signal quality measurement (block 920).

A determination is then made whether the timer has expired (block 922). If the answer is 'no', then the process returns to block 912. Otherwise, a determination is made whether information needed for a scan of another frequency channel is available (block 924). If the answer is 'yes', then a scan of another frequency channel is performed to search for candidate base stations (block 928). Otherwise, the wireless device waits until the information becomes available (e.g., by going to sleep until the next slot cycle) (block 926) and then performs the scan of another frequency channel (block 928). From block 928, the process returns to block 910.

Three schemes for performing scanning of other frequency channels are described above. Other schemes may also be implemented based on the description provided herein, and this is within the scope of the invention. Furthermore, these schemes may be implemented in various manners which may be different from that described above.

The wireless device may be provided with zero, one, or multiple other CDMA channels. The wireless device may scan the CDMA channels in various manners. In one embodiment, one timer is maintained for all of the other CDMA channels. This timer may be set and/or updated based on the active pilot Ec/Io, as described above. Whenever the timer expires, the wireless device can scan one of the other CDMA channels. The other CDMA channels may be ordered and selected for scanning in sequential order. Alternatively, the other CDMA channels may be ranked, e.g., based on the pilot Ec/Io measurements obtained for these channels. The wireless device can then scan the highest-ranking other CDMA channel whenever the timer expires. In another embodiment, one timer is maintained for each of the other CDMA channels. Each timer may be set and/or updated based on active pilot measurements and/or other information obtained for the associated CDMA channel. For example, each timer may be set to a fixed initial value and thereafter adjusted by variable amounts determined by the pilot Ec/Io measurements obtained for that channel. Each CDMA channel may be scanned whenever its associated timer expires.

The scan of another CDMA channel may produce one or more candidate base stations to which the wireless device may decide to handoff. A "handoff penalty", which is a form of hysteresis, may be used to avoid handoff ping-ponging. The hysteresis is implemented by requiring a candidate base station to have a pilot Ec/Io that is some amount higher than the active pilot Ec/Io. This amount is called the handoff penalty and may be a function of the active pilot Ec/Io.

Figure 10:
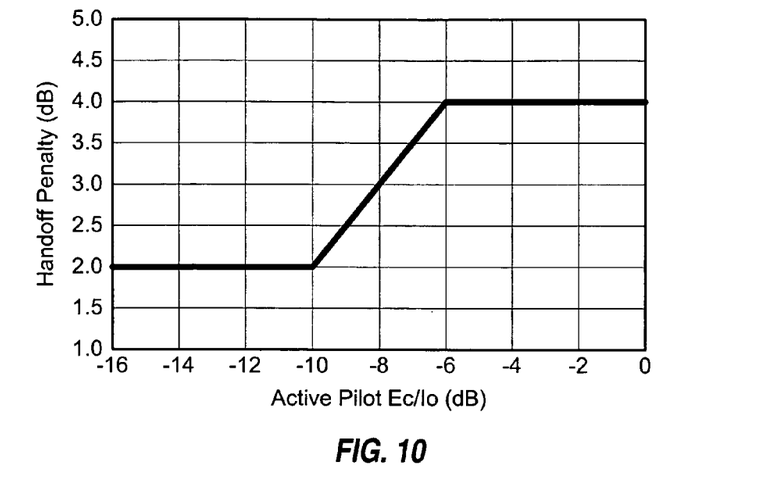
FIG. 10 shows a plot of handoff penalty versus active pilot Ec/Io.

FIG. 10 shows a plot of the handoff penalty versus active pilot Ec/Io. If the active pilot Ec/Io is between −16 dB and −10 dB, then a handoff to a candidate base station is allowed if the pilot Ec/Io for the candidate base station is at least 2 dB higher than the active pilot Ec/Io. If the active pilot Ec/Io is −6 dB or higher, then a handoff to a candidate base station is allowed if the pilot Ec/Io for this candidate base station is at least 4 dB higher than the active pilot Ec/Io. The handoff penalty increases linearly from 2 dB to 4 dB for active pilot Ec/Io between −10 dB and −6 dB. The function shown in FIG. 10 has higher handoff penalty for higher active pilot Ec/Io, which discourages handoff for higher active pilot Ec/Io. This characteristic is acceptable since the received signal quality for the active base station is sufficiently good at the higher active pilot Ec/Io. This characteristic can reduce power consumption while keeping the wireless device on a good base station.

FIG. 10 shows a specific implementation. In general, the handoff penalty may be selected such that the desired handoff policy and the desired tradeoff between power consumption and performance can be achieved. Performing more scans may result in more handoffs to base stations on other CDMA channels. The handoff penalty may be selected to accept, encourage, or discourage such behavior. The penalty for handoffs to base stations on other CDMA channels may also be set equal to the penalty for handoffs to base stations on the same CDMA channel. This may simplify implementation and also imposes no discrimination against handoffs to base stations on other CDMA channels.

Figure 11:
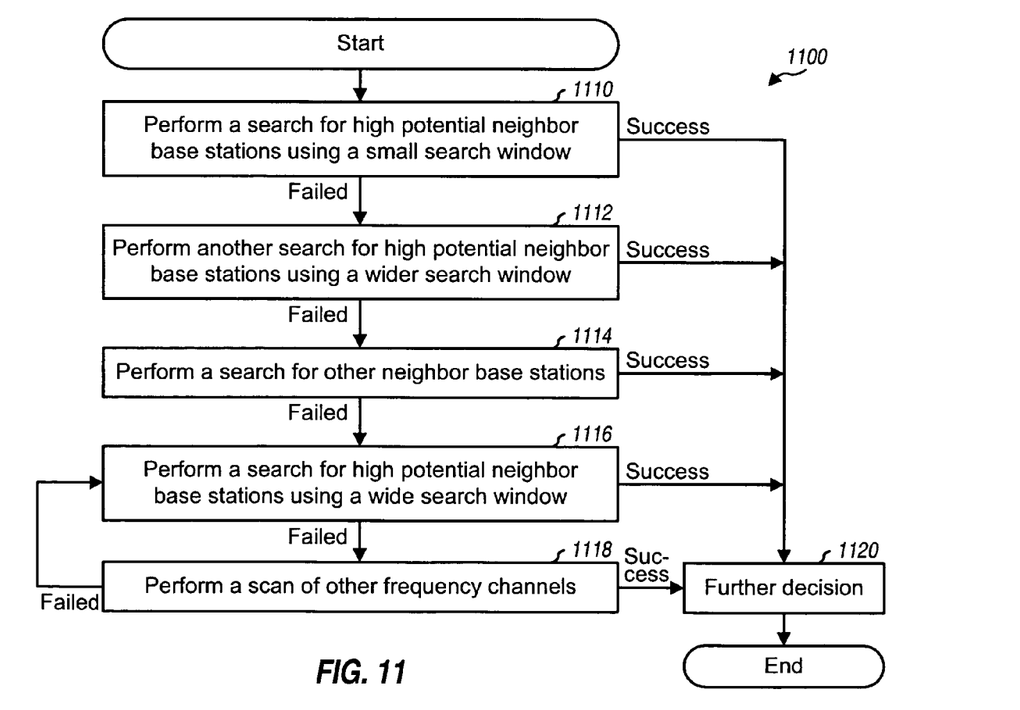
FIG. 11 shows a signal recovery procedure.

FIG. 11 shows a specific implementation of a signal recovery procedure 1100, which may be performed if the signal from the active base station is considered to be lost. For procedure 1100, the wireless device initially performs a search for the base stations in a high potential neighbor list using a small search window (block 1110). A search window is a range of PN offsets to search for pilots transmitted by base stations. If this search fails and no base stations are found, then the wireless device performs another search for the base stations in the high potential neighbor list using a wider search window (block 1112). If this second search fails, then the wireless device performs a search for the base stations in a neighbor list compiled from information sent in a Neighbor List Message, an Extended Neighbor List, or a Universal Neighbor List by the active base station (block 1114). If this search fails, then the wireless device performs a search for the base stations in the high potential neighbor list using a wide search window, which is sent by the active base station via over-the-air (OTA) signaling (block 1116). The wireless device thus performs different searches for base stations on the same frequency channel in blocks 1110 through 1116 using different search parameters and over a period of time. If all of these searches fail, then the wireless device performs a scan of other frequency channels (block 1118). If the other channel scan fails, then the process returns to block 1116 and the wireless device retries the search for the base stations in the high potential neighbor list with the wide search window. The process transitions between blocks 1116 and 1118 until a suitable base station is found or until the timer expires within a T30m time period (which is three seconds) specified by cdma2000. If a suitable base station is found by a search/scan in any of blocks 1110 through 1118, then the process proceeds to block 1120 and this base station is selected to receive communication service from. If no base station is found before the T30m timer expires, then the system is lost and the wireless device returns to system determination.

Figure 12:
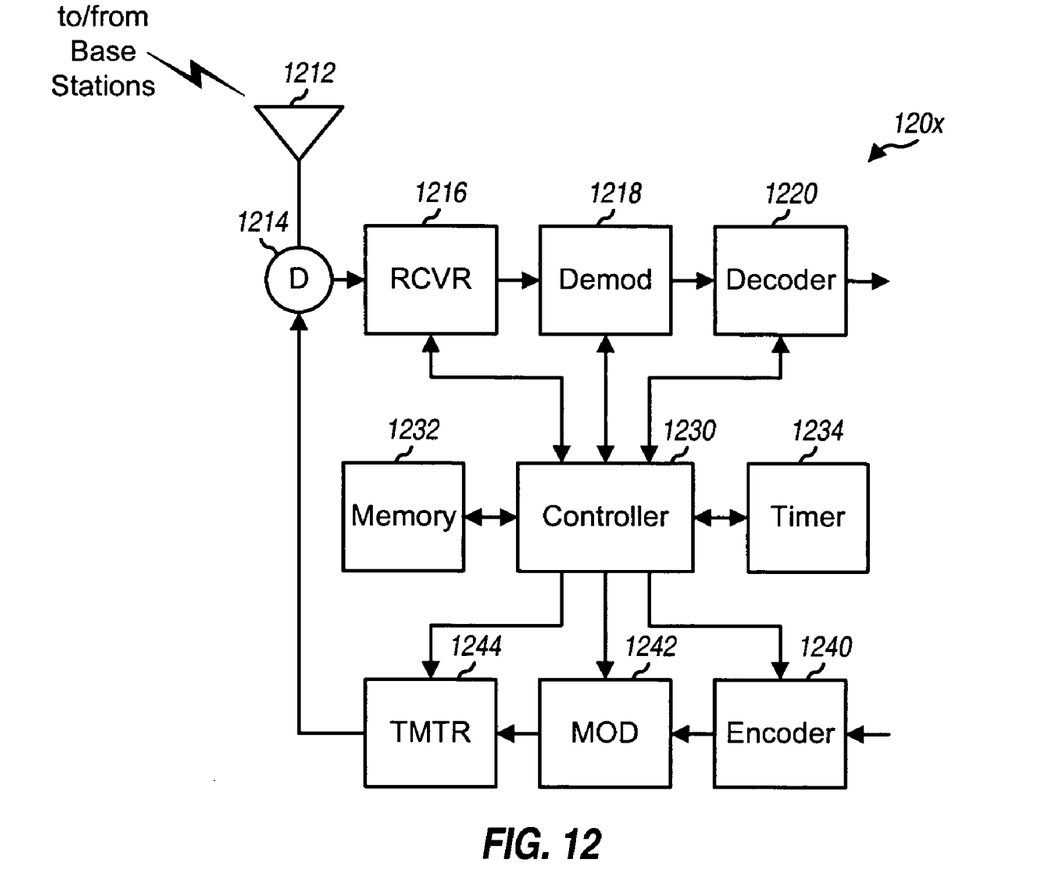
FIG. 12 shows a block diagram of a wireless device.

FIG. 12 shows a block diagram of an embodiment of a wireless device 120x, which is capable of performing scan of other frequency channels. On the forward link, one or more forward link signals from one or more base stations are received by an antenna 1212, routed through a duplexer 1214, and provided to a receiver unit (RCVR) 1216. Receiver unit 1216 conditions (e.g., filters, amplifies, and frequency downconverts) the received signal and further digitizes the conditioned signal to obtain data samples. A demodulator (Demod) 1218 then processes (e.g., despreads, descrambles, dechannelizes, and data demodulates) the data samples and provides demodulated data. A decoder 1220 further deinterleaves and decodes the demodulated data and provides decoded data. The processing by demodulator 1218 and decoder 1220 is known in the art.

On the reverse link, data to be transmitted by wireless device 120x is processed (e.g., coded, interleaved, and symbol mapped) by an encoder 1240, further processed (e.g., channelized and spectrally spread) by a modulator (MOD) 1242, and conditioned (e.g., amplified, filtered, and frequency upconverted) by a transmitter unit (TMTR) 1244 to generate a reverse link signal. The reverse link signal is routed through duplexer 1214 and transmitted via antenna 1212 to one or more base stations.

A controller 1230 directs the operation of various processing units within the wireless device. A memory unit 1232 stores data and code used by controller 1230 and possibly other processing units within the wireless device.

If the wireless device is in the Idle state (e.g., operating in the slotted mode or the non-slotted mode), then controller 1230 may perform various tasks for sleep and for scans of other frequency channels. Controller 1230 may receive pilot measurements from demodulator 1218, determine whether or not to perform scans of other frequency channels, and maintain a timer 1234 to determine when to perform a scan of another frequency channel. Controller 1230 may set timer 1234 with a fixed or variable initial value and thereafter adjust the timer by a fixed or variable amount (e.g., determined based on the pilot measurements, as described above). Timer 1234 provides an indication to controller 1230 whenever the timer expires. Controller 1230 then performs the necessary tasks to initiate a scan of another frequency, if appropriate. Controller 1230 also controls various processing units (e.g., shutting down these units during sleep).

The techniques described herein for scanning other frequency channels may be implemented by various means. For example, these techniques may be implemented in hardware, software, or a combination thereof. For a hardware implementation, the processing units used to perform scanning of other frequency channels may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the scanning techniques may be implemented with modules (e.g., procedures, functions, and so on) that perform the functions described herein. The software codes may be stored in a memory unit (e.g., memory unit 1232 in FIG. 12) and executed by a processor (e.g., controller 1230). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. At a wireless device in a wireless communication system, a method of scanning other frequency channels for candidate base stations for handoff, comprising:
   setting a timer to an initial value;
   initiating the timer to perform a countdown from the initial value;
   obtaining a received signal quality measurement for an active base station transmitting messages for the wireless device on a first frequency channel during said countdown;
   adjusting the timer by an adjustment value selected based on the received signal quality measurement during said countdown;
   repeating the obtaining and adjusting until the timer expires; and
   performing a scan of a second frequency channel for candidate base stations after expiration of the timer, the second frequency channel being different from the first frequency channel.

2. The method of claim 1, further comprising:
   determining which one of a plurality of ranges of measurement values the received signal quality measurement falls within, wherein each range is associated with a different adjustment value; and
   selecting the adjustment value associated with the range within which the received signal quality measurement falls, and wherein the timer is adjusted by the selected adjustment value.

3. The method of claim 2, wherein ranges with progressively higher measurement values are associated with progressively longer time durations before the timer expires.

4. The method of claim 2, wherein the plurality of ranges include a first range covering −8 dB to −13 dB and a second range covering −13 dB to −16 dB.

5. The method of claim 2, wherein the plurality of ranges include first and second ranges, wherein the first range is associated with a first adjustment value equal to an elapsed time occurring after a last adjustment of the timer, and wherein the second range is associated with a second adjustment value equal to multiple times the elapsed time.

6. The method of claim 1, wherein the performing the scan of the second frequency channel comprises:
   determining whether information needed for the scan of the second frequency channel is available; and
   delaying the scan of the second frequency channel until the information is available.

7. The method of claim 1, further comprising:
   performing a handoff to a candidate base station found by the scan of the second frequency channel if a received signal quality measurement for the candidate base station exceeds the received signal quality measurement for the active base station by a predetermined amount.

8. The method of claim 7, wherein the predetermined amount is variable and dependent on the received signal quality measurement for the active base station.

9. The method of claim 1, wherein the received signal quality measurement is a pilot measurement.

10. An apparatus in a wireless communication system, comprising:
    a demodulator operative to obtain received signal quality measurements for an active base station transmitting messages for the apparatus on a first frequency channel, one received signal quality measurement for each measurement event;
    a timer operable to be set to an initial value when directed to countdown from said initial value until expired, and to be adjusted during said countdown by adjustment values selected based on the received signal quality measurements; and
    a controller operative to direct setting of the timer and initiate a scan of a second frequency channel for candidate base stations after expiration of the timer, the second frequency channel being different from the first frequency channel.

11. The apparatus of claim 10, wherein the controller is further operative to, for each received signal quality measurement,
    determine which one of a plurality of ranges of measurement values the received signal quality measurement falls within, wherein each range is associated with a different adjustment value, and select the adjustment value associated with the range within which the received signal quality measurement falls, and wherein the timer is operable to be adjusted by the selected adjustment value for each received signal quality measurement.

12. An apparatus in a wireless communication system, comprising:

means for setting a timer to an initial value;

means for initiating the timer to perform a countdown from the initial value;

means for obtaining a received signal quality measurement for an active base station transmitting messages for the apparatus on a first frequency channel during said countdown;

means for adjusting the timer by an adjustment value selected based on the received signal quality measurement during said countdown;

means for repeating the obtaining and adjusting until the timer expires; and means for performing a scan of a second frequency channel for candidate base stations after expiration of the timer, the second frequency channel being different from the first frequency channel.

13. The apparatus of claim 12, further comprising:

means for determining which one of a plurality of ranges of measurement values the received signal quality measurement falls within, wherein each range is associated with a different adjustment value; and means for selecting the adjustment value associated with the range within which the received signal quality measurement falls, and wherein the timer is adjusted by the selected adjustment value.

* * * * *